(12) United States Patent
Uehara et al.

(10) Patent No.: US 6,894,641 B2
(45) Date of Patent: May 17, 2005

(54) RADAR SYSTEM MOUNTED ON VEHICLE

(75) Inventors: Naohisa Uehara, Tokyo (JP); Koichi Kai, Tokyo (JP)

(73) Assignee: Mitsubishi Denki Kabushiki, Tokyo (JP)

( * ) Notice: Subject to any disclaimer, the term of this patent is extended or adjusted under 35 U.S.C. 154(b) by 0 days.

(21) Appl. No.: 10/699,814

(22) Filed: Nov. 4, 2003

(65) Prior Publication Data

US 2004/0095269 A1 May 20, 2004

(30) Foreign Application Priority Data

Nov. 15, 2002 (JP) ........................................ 2002-331542

(51) Int. Cl.⁷ ............................ G01S 7/40; G01S 13/93
(52) U.S. Cl. ........................ 342/173; 342/70; 342/82; 342/89; 342/91; 342/92; 342/104; 342/109; 342/118; 342/128; 342/130; 342/131; 342/132; 342/159; 342/165; 342/175; 342/195; 342/196
(58) Field of Search ................. 342/104–115, 13–20, 342/70–72, 74–103, 118, 128–135, 159–175, 192–197; 180/167–169; 701/300, 301

(56) References Cited

U.S. PATENT DOCUMENTS

| | | | | |
|---|---|---|---|---|
| 3,889,259 A | * | 6/1975 | Fukumori | ................. 342/71 |
| 3,898,655 A | * | 8/1975 | Tresselt | ................. 342/83 |
| 4,965,581 A | * | 10/1990 | Skudera, Jr. et al. | ......... 342/19 |
| 5,424,674 A | * | 6/1995 | Skudera, Jr. et al. | ......... 342/19 |
| 5,669,151 A | | 9/1997 | Collingwood | |
| 6,094,160 A | * | 7/2000 | Lajiness | ................. 342/70 |
| 6,611,227 B1 | * | 8/2003 | Nebiyeloul-Kifle et al. | 342/173 |
| 6,618,003 B2 | * | 9/2003 | Voigtlaender et al. | ...... 342/159 |

FOREIGN PATENT DOCUMENTS

| | | |
|---|---|---|
| JP | 7-84042 A | 3/1995 |
| JP | 3185547 B2 | 5/2001 |

* cited by examiner

*Primary Examiner*—Bernarr E. Gregory
(74) *Attorney, Agent, or Firm*—Sughrue Mion, PLLC

(57) ABSTRACT

To provide a radar system mounted on a vehicle that reliably detects the reception of the interference wave with high-performance and inexpensively. There is provided a radar system mounted on a vehicle for detecting a target object, including a transmitter for transmitting an electromagnetic wave, a receiver for receiving the electromagnetic wave reflected by the target object, a signal processor for measuring a distance between a vehicle of his/her own and the target object and a relative velocity on the basis of the transmitting electromagnetic wave and the receiving electromagnetic wave, and an interference detector for suspending a transmit operation of the transmitter under a control of the signal processor to detect an interference signal from another external device.

12 Claims, 6 Drawing Sheets

RADAR SYSTEM MOUNTED ON VEHICLE

BACKGROUND OF THE INVENTION

1. Field of the Invention

The present invention relates to a radar system mounted on a vehicle, and more particularly to a radar system mounted on a vehicle such as an automobile and used for measurement of a distance between vehicles.

2. Description of the Related Art

As such a general radar system mounted on the vehicle, there have been known many radar systems which are downsized by using a transmit/receive shared antenna and improves in the mounting property of a subject automobile. In the radar system of this type, an electromagnetic wave of a frequency of, for example, a transmitting frequency ftx= 76.5 GHz is outputted from an oscillator, and the electromagnetic wave is allowed to pass through a power divider and amplified by a transmitting antenna. The electromagnetic wave amplified by the transmitting amplifier is allowed to pass through a transmit/receive changeover switch and is outputted to a space from the transmit/receive shared antenna. Also, the electromagnetic wave outputted to the space from the transmit/receive shared antenna is reflected from a target object that exists at a distance R, and then, input to the transmit/receive shared antenna with a delay time $\Delta t$ that depends on the distance R with respect to the transmitting electromagnetic wave. Also, when the target object has a relative velocity, a receive electromagnetic frequency is Doppler-shifted by a given amount with respect to the transmit electromagnetic frequency, and then, input to the transmit/receive shared antenna. The relative distance and the relative velocity of the target object are calculated on the basis of the receiving electromagnetic wave input to the transmit/receive shared antenna.

As another conventional radar system mounted on a vehicle, there has been also known a car-to-car distance measuring device using a pulsed laser beam that detects interference due to a receive level of an incident light and periodicity of detection or a variation of the measured distance (for example, refer to Japanese Patent No. 03185547).

However, the above-mentioned conventional general radar system mounted on the vehicle has an S/N ratio deteriorated upon receiving an interference wave of another radio device or another automobile radar, resulting in a case in which detection may be in failure or a detection error may occur. Thus, there arises such a problem that a vehicle control system or an alarm system fails.

Also, in the radar system disclosed in Japanese Patent No. 03185547, a car-to-car distance measuring device obtains a distance at the transmit/receive time interval of a pulse light when receiving the pulse light that is equal to or higher than a predetermined threshold value with respect to one pulse transmit light. Therefore, in the case where the car-to-car distance measuring device receives an interference pulse before receiving a reflection light from the target after transmitting the pulse light, there arises such a problem that a receive light level is relatively constant and large and a distance value is inaccurate. The interference is detected by the variation of the receive level or the distance by using that characteristics. However, because the radar using an electric wave and the radar using the light are different from each other in a principle for detecting the reflection wave, Japanese Patent No. 03185547 arises such a problem that the electric wave type radar does not function accurately. In particular, in the case of the electric wave, because the interface wave and the transmit wave are subjected to various modulations such as frequency modulation, pulse modulation or phase modulation, an output signal of the interference wave is different depending on a combination of those modulations. Also, in the case of the radar using the electric wave, there arises such a problem that the interface wave input within an observation time reliably induces deterioration of detection performance or detection error.

SUMMARY OF THE INVENTION

The present invention has been made to solve the above-mentioned problems, and therefore an object of the present invention is to provide a radar system mounted on a vehicle which reliably detects the reception of the interference wave with high performance and inexpensively.

With the above object in view, a radar system of the present invention mounted on a vehicle for detecting a target object comprises a transmitting means for transmitting an electromagnetic wave and a receiving means for receiving the electromagnetic wave reflected by the target object. The radar system also comprises a signal processing means for measuring a distance between a vehicle of his/her own and the target object and a relative velocity on the basis of the transmitting electromagnetic wave and the receiving electromagnetic wave. The system further comprises an interference detecting means for suspending a transmit operation of the transmitting means under a control of the signal processing means to detect an interference signal from an other external device. With this structure, upon detecting the interference, since only the receive operation is conducted without conducting the transmit operation, only the interface wave entering into the radar can be reliably measured without measuring the reflection wave of an obstacle on a road, to thereby improve the reliability of the interference detection. Also, since the interference detection can be implemented only by the radar signal processing without adding the special hardware (H/W) for detection of the interference, an inexpensive radar system mounted on the vehicle can be realized with high performance.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

Now, a description will be given in more detail of preferred embodiments of the present invention with reference to the accompanying drawings.

First Embodiment

Figure 1:
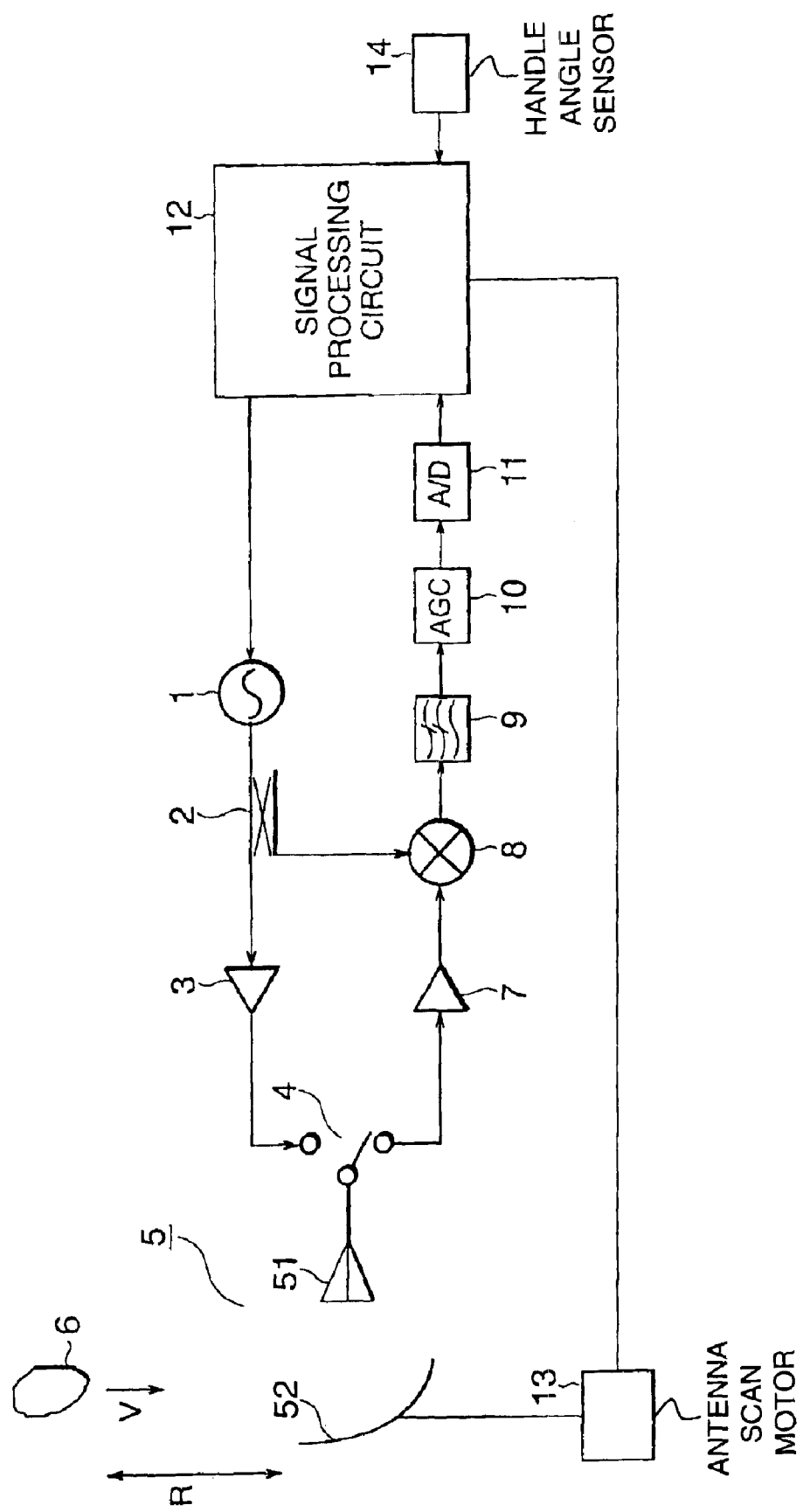
FIG. 1 is a block diagram showing a structure of a radar system mounted on a vehicle in accordance with the present invention.

FIG. 1 is a block diagram showing a structure of a radar system mounted on a vehicle in accordance with the present invention. An example shown in FIG. 1 also uses a transmit/receive shared antenna. As shown in FIG. 1, a power divider 2 is located so as to input an electromagnetic wave outputted from an oscillator 1. The electromagnetic wave is divided into two waves by the power divider 2, one of which is input to a transmitting amplifier 3 and the other of which is input to a mixer 8. Downstream of the transmitting amplifier 3 is located an antenna 5 composed of a primary radiator 51 and a reflector antenna 52 through a transmit/receive changeover switch 4. Also, there is disposed a receive amplifier 7 for inputting the electromagnetic wave reflected by the target object 6 and received by the antenna 5, and an output from the receive amplifier 7 is input to the above-mentioned mixer 8. Downstream of the mixer 8 are disposed a filter 9, an AGC amplifier 10, and an AD converter 11 in the stated order. Also, there is disposed a signal processing circuit 12 that calculates a relative distance and a relative velocity of the target object 6 on the basis of the output from the A/D converter 11. Also, an antenna scan motor 13 for changing the transmit/receive direction of the electromagnetic wave is disposed between the signal processing circuit 12 and the reflector antenna 51. In addition, a handle angle sensor 14 for detecting a handle angle is connected to the signal processing circuit 12.

Subsequently, an electromagnetic wave transmit/receive operation of the radar system mounted on the vehicle structured above in accordance with the present invention will be described roughly with reference to FIG. 1. First of all, an electromagnetic wave transmit operation will be described.

First, an electromagnetic wave having a frequency of, for example, a transmitting frequency ftx=76.5 GHz is outputted from the oscillator 1. The electromagnetic wave is allowed to pass through the power divider 2, and then, amplified by the transmitting amplifier 3. Since the transmit/receive changeover switch 4 connects the transmitting amplifier 3 and the antenna 5, the electromagnetic wave amplified by the amplifier 3 passes through the transmit/receive changeover switch 4 and is then outputted to the space from the antenna 5.

Figure 3:
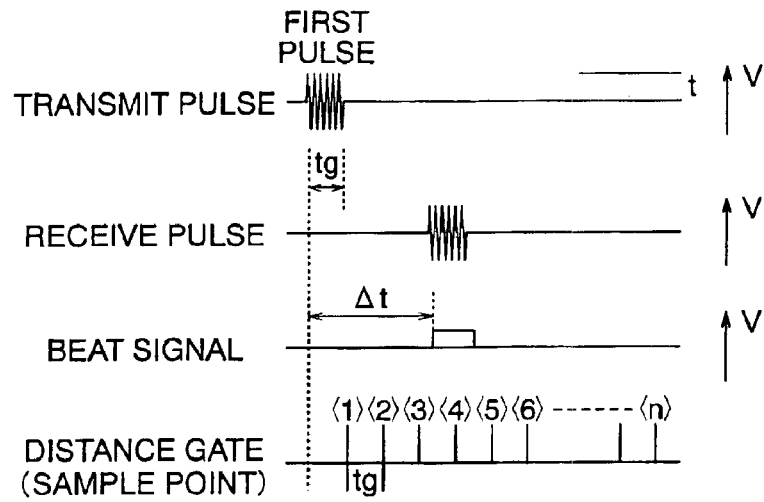
FIG. 3 is an explanatory diagram showing a method of calculating a relative distance and a relative velocity of the radar system mounted on the vehicle in accordance with the present invention.

Then, an electromagnetic wave receive operation will be described. At the time when a pulse time width Tg, for example, 33.3 ns (=1/30 MHz, corresponding to a distance 5 m) has elapsed from the electromagnetic wave transmit start time, the transmit/receive changeover switch 4 switches to the receive side to connect the antenna 5 and the receive amplifier 7. At this time, in this embodiment, it is judged whether or not it is the direction of implementing interference detection and if it is the direction of implementing the interference detection, the transmit operation is turned off. More specifically, transmission is not conducted in a state where the transmit/receive changeover switch 4 shown in FIG. 1 is connected to the receive side. The electromagnetic wave outputted from the antenna 5 to the space is reflected from the target object 6 that exists at the distance R, and then, input to the antenna 5 with a delay time $\Delta t$ depending on the distance R with respect to the transmitting electromagnetic wave as shown in FIG. 3. Also, when the target object 6 has a relative velocity, the receiving electromagnetic wave frequency is Doppler-shifted by fb with respect to the transmitting electromagnetic wave frequency ftx, and then, input to the antenna 5. The electromagnetic wave input by the antenna 5 is amplified by the receive amplifier 7, and then, mixed with an LO electromagnetic wave from the power divider 2 by the mixer 8, to thereby output a beat signal corresponding to the Doppler shift fb shown in FIG. 1. The obtained beat signal passes through a filter 9 of a cutoff frequency 30 MHz, is then amplified by an AGC 10, and input to an A/D converter 11. The signal processing circuit 12 calculates the relative distance and the relative velocity of the target object 6 on the basis of data input to the A/D converter 11.

Subsequently, a detailed operation of the radar system mounted on the vehicle according to the present invention will be described with reference to FIG. 2. First, the antenna is directed to a predetermined direction θ1 in Step S100. In Step S200, it is judged whether or not the predetermined direction θ1 is the direction of implementing predetermined interference detection. If not, distance measuring, velocity measuring, and receive level measuring processes are conducted in Step S700. Now, those processes will be described. A sequential roving system will be described as an example.

In Step S700, after the signal processing circuit 12 first measures the distance, the relative velocity, and a receive level M1 in the predetermined direction θ1, the signal processing circuit 12 operates the antenna scan motor 13 so as to move the antenna scan motor 13 in a succeeding direction θ2, and then, measures the distance, the relative velocity and a receive level M2, likewise. It is possible that the same distance and relative velocity data are selected from detection data in those plural directions, and an angle to the direction θ of the target object can be basically measured in accordance with a comparison of the receive level M1 and the receive level M2.

More specifically, a sum pattern S(θ) and a difference pattern D(θ) are obtained from antenna beam patterns B1(θ) and B2(θ) in two predetermined directions θ1 and θ2 on the basis of the following expressions.

$$S(\theta)=B1(\theta)+B2(\theta) \qquad (1)$$

$$D(\theta)=B1(\theta)-B2(\theta) \quad (2)$$

Then, the following expression DS(θ) standardized by S(θ) is obtained.

$$DS(\theta)=D(\theta)/S(\theta) \quad (3)$$

Then, within a half width θs of S(θ), DS(θ) has a relationship of monotone increase or monotone decrease with respect to θ.

Assuming that the center of the predetermined two directions θ1 and θ2 is θo, and the half width of S(θ) is θs, the angle θn standardized by θs and a slope k of DS(θ) in the vicinity of θn=0 are obtained on the basis of the following expressions.

$$\theta n=(\theta-\theta o)/\theta s \quad (4)$$

$$k=DS(\theta)/\theta n \quad (5)$$

Also, DS obtained by observation from the receive level M1 and the receive level M2 is obtained on the basis of the following expression.

$$DS=(M1-M2)/(M1+M2) \quad (6)$$

Therefore, θcan be obtained from θs, k, θo which can be calculated in advance and DS which is obtained by observation on the basis of the following expression.

$$\theta=\theta s/k \cdot DS+\theta o \quad (7)$$

It is judged whether or not the target object is a precedent vehicle that travels on the same lane as a vehicle of his/her own, on the basis of results of obtaining the radius of curvature of a road from the handle angle sensor 14 or the like and according to the distance to the target object, the relative velocity, and the angle which are measured in the above-mentioned manner. The vehicle of his/her own conducts a pursuing travel maintaining a safe distance between vehicles with a between-vehicle distance alarm.

Figure 2:
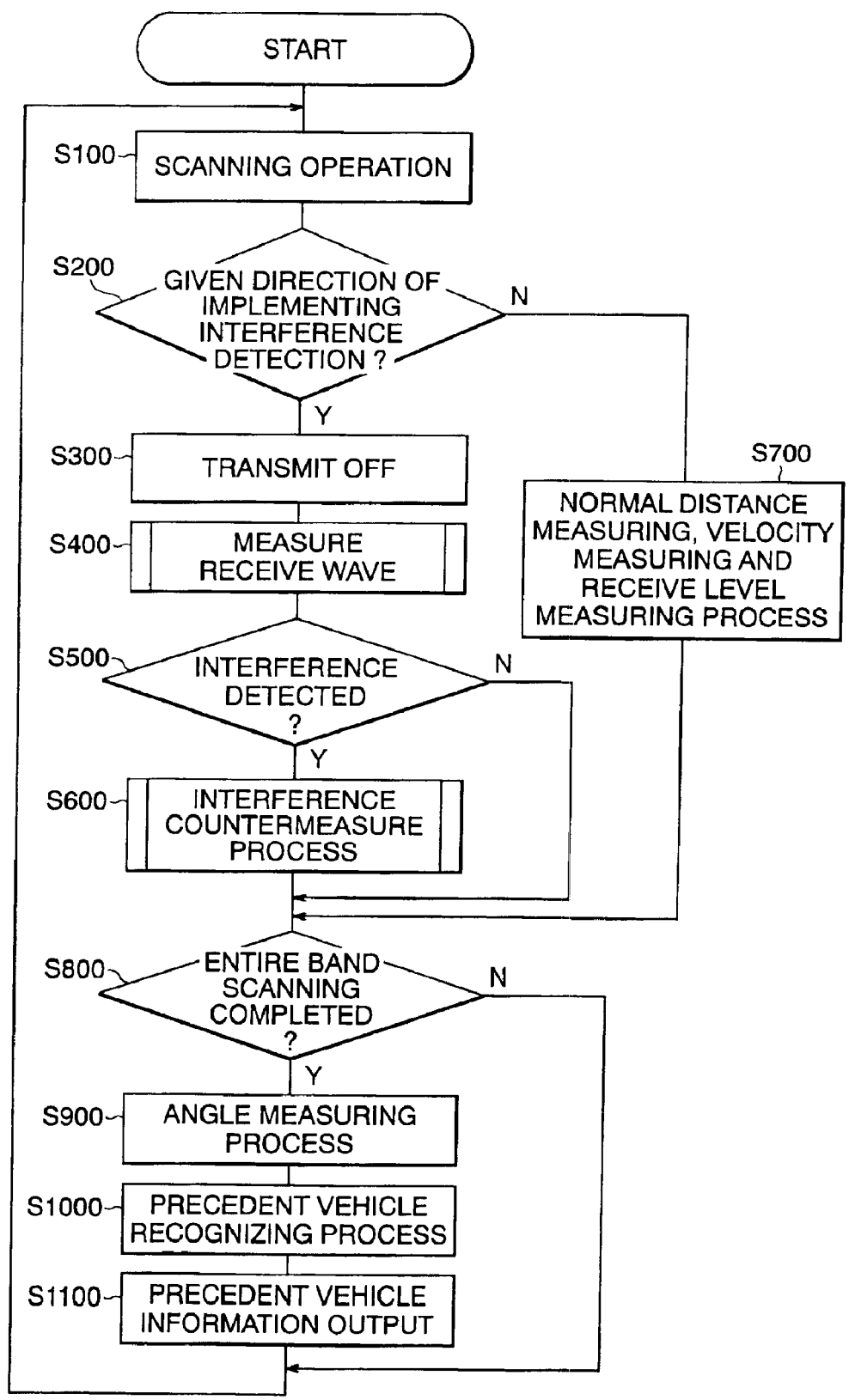
FIG. 2 is a flowchart showing an interference detecting process of the radar system mounted on the vehicle in accordance with the present invention.

Returning to the description of FIG. 2, if it is the direction of implementing the interference detection in Step S200, transmission is turned off in Step S300. More specifically, transmission is not conducted in a state where the transmit/receive changeover switch 4 shown in FIG. 1 is connected to the receive side.

Then, the receive wave is measured in Step S400. The measurement is conducted by implementing FFT (fast Fourier transform) for each of distance gates. A detailed description will be given below.

A description will be given of a method by which the signal processing circuit 12 calculates the relative distance and the relative velocity of the target object 6 on the basis of data of the receive wave input to the A/D converter 11 in Step S400. In this example, assuming that, for example, a velocity resolution 1 km/h is intended to be obtained, the resolution Δf of the Doppler frequency is represented on the basis of the transmitting frequency ftx=76.5 GHz by the following expression (8).

$$\Delta f=2\Delta v/\lambda=(2\times 0.2777(m/s))/(0.003921(m))=141.64(Hz)=1/(7.05977(ms)) \quad (8)$$

Figure 4A:
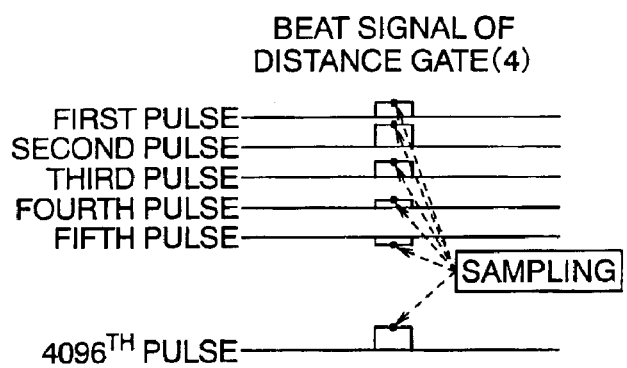
FIGS. 4A and 4B are explanatory diagrams showing the method of calculating the relative distance and the relative velocity of the radar system mounted on the vehicle in accordance with the present invention.
Figure 4B:
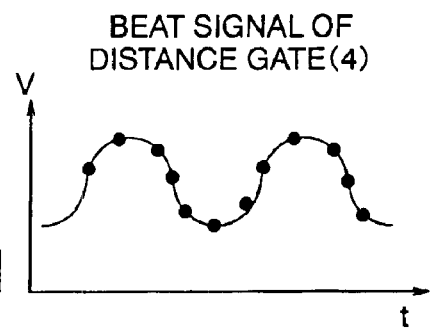
Figure 5:
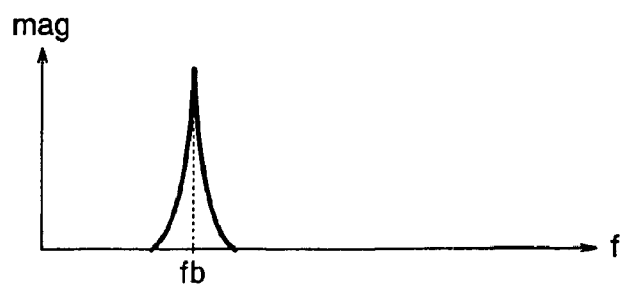
FIG. 5 is an explanatory diagram showing the method of calculating the relative distance and the relative velocity of the radar system mounted on the vehicle in accordance with the present invention.

It is found from the above expression that the measurement time of period of 7.06 ms is required. At this time, for example, in the case where a maximum detection distance of the radar is 150 m and a maximum measurement distance is set to about 260 m taking into consideration a margin of a distance as long as a previous pulse is not received, since a pulse cycle period becomes 33.3 ns×52=1.7 μs, beat signals of 4096 pulses are acquired for each of the distance gates in the above-mentioned device as shown in FIG. 4, in order to obtain the velocity resolution 1 km/h, and then, outputted as the beat signals of the Doppler shift fb and the receive level M at a distance gate shown in FIG. 5 when all of data is subjected to FFT for each of the distance gates. In this case, the distance and the relative velocity can be calculated on the basis of the following expressions (9) and (10).

$$\text{distance}=(tg\times n\times C)/2 \quad (9)$$

$$\text{relative velocity}=(fb\times C)/(2\times f0) \quad (10)$$

where tg is a distance gate time width (pulse time width), n is a distance gate number, C is a velocity of light, fb is a beat frequency, and f0 is a transmitting frequency (76.5 GHz).

Again returning to the description of FIG. 2, it is judged whether or not the interference wave is to be detected, in Step S500, and if the interference wave is detected, a countermeasure which makes an adverse affect caused by the interference wave minimum in Step S600 is conducted (a specific operation in Step S500 will be described with reference to second to fourth embodiments to be described later). For example, a fail output or the like is conducted at the vehicle system side. If it is judged that the overall scanning range is scanned in Step S800, an angle measuring process is conducted in Step S900. In Step S1000, the vehicle is recognized on the basis of the distance measuring, velocity measuring and angle measuring results which are obtained in Steps S700 and S900, and the travel lane is recognized on the basis of the output from the handle angle sensor 14, to thereby recognize the vehicle existing on the travel lane as a precedent vehicle. In Step S1100, the distance, the velocity and the angle of the precedent vehicle are outputted to the system side. The travel lane may be recognized in accordance with an output from a forward monitoring camera, a yaw rate sensor or the like instead of the handle angle sensor 14.

The signal processing circuit 12 may sweep the transmitting frequency of the oscillator 1 to constitute an FM pulse radar.

Figure 6:
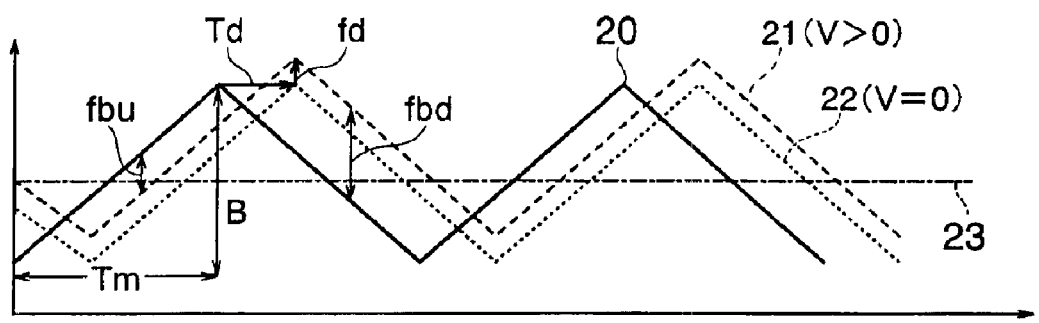
FIG. 6 is an explanatory diagram showing the method of calculating the relative distance and the relative velocity of the radar system mounted on the vehicle in accordance with the present invention.

A method of calculating the relative distance and the relative velocity in the FM pulse radar will be described. FIG. 6 shows an example for calculating the relative distance and the relative velocity using the above-mentioned radar system. In FIG. 6, the transmitting electromagnetic wave is FM-modulated by a frequency sweep band width B and a modulation cycle Tm of the transmitting electromagnetic wave. In the case where the velocity resolution 1 km/h is intended to be obtained as described above, the modulation cycle Tm requires a measurement period of time of 7.06 ms. A receiving electromagnetic wave has a delay time At until a transmitting electromagnetic wave is reflected by the target object 6 that exists at the distance R and then input to the transmit/receive shared antenna 5. Also, when the target object has the relative velocity, the receiving electromagnetic wave is Doppler-shifted by fd with respect to the transmitting electromagnetic wave. At this time, a frequency difference fbu between the transmit signal and the receive signal at the time when the frequency goes up and a frequency difference fbd between the transmit signal and the receive signal at the time when the frequency goes down are outputted as the beat signals by the mixer 8. The beat signal is taken in the signal processing circuit 12 as data by the A/D converter 11, and then, subjected to FFT processing, to thereby obtain the above-mentioned frequency differences fbu, fbd, and their receive levels M. The receive levels of the frequency differences fbu and fbd are generally identical with each other and become M.

The relative distance R and the relative velocity V of the target object are obtained from the above-mentioned fbu, fbd, Tm, B, the velocity of light C (=$3.0\times10^8$ m/s) and the wavelength $\lambda$ of a carrier wave (if a fundamental frequency of the carrier wave is $F_0$=77 GHz, $\lambda$=$4.0\times10^{-3}$ m) through the following expression (11).

$$R=(TmC/4B)\times(fbu+fbd),\ V=(\lambda/4)\times(fbu-fbd) \qquad (11)$$

Accordingly, in the case of the FM pulse radar, the process is conducted at the respective distance ranges, and the distance resolution and the precision are improved as compared with the above-mentioned pulse radar, and only the frequencies fbu and fbd of a spectrum of the target object 6 within the range limited by the distance range are observed, thereby making it difficult to generate a virtual image occurring due to the combination error of the spectrums fbu and fbd at the time when a plurality of target objects 6 exist.

As described above, in the first embodiment, upon conducting the interference detection, since the transmit operation is suspended in Step S300 to conduct only the receive operation without conducting the transmit operation, only an interference wave entering into the radar can be reliably measured without measuring a reflection wave from an obstacle on a road, to thereby improve the reliability of the interference detection. Also, since the interference detection can be implemented by only the radar signal processing without adding a special hardware (H/W) for interference detection, it is possible to realize the radar system mounted on the vehicle which has high performance and is inexpensive. Further, since the interference detection is implemented in a predetermined scanning direction, it hardly affects the radar performance such as the data output cycle or angle measuring precision of the radar.

Note that, in this case, the interference detection using the antenna scanning is described, but the interference detection can be implemented even if the antenna scanning is not conducted.

Second Embodiment

Figure 7:
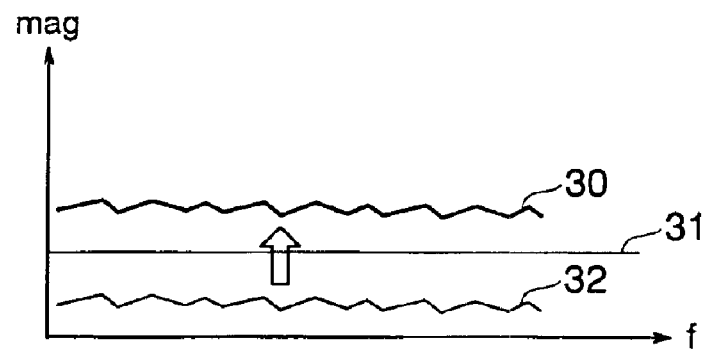
FIG. 7 is an explanatory diagram showing an FFT result when receiving an interference wave in a second embodiment of the present invention.

A method of judging whether or not the interference wave is observed, in Step S500 in the first embodiment will be hereinbelow described as a second embodiment. A transmit wave from another radar uses various modulation systems, and a probability that a transmitting frequency, a modulation timing, a receive timing or the like completely coincides with each other is very low. In this case, since there is no correlation when the interference wave is received, the spectrum of the interference wave signal cannot be reproduced by FFT, and a noise floor increases as a white noise as indicated by the FFT results shown in FIG. 7. In FIG. 7, reference numeral 30 denotes a noise floor at the time of receiving the interference wave, reference numeral 31 is a given threshold level for interference detection, and reference numeral 32 is a heat noise. In the case where a threshold level for detection of the interference wave which is given times of the noise floor level at the time of receiving no interference wave is predetermined, and the noise floor becomes higher than the threshold level, it is judged that the interference wave is received.

As described above, since the interference detection is conducted by suspending the transmit operation and detecting the rise of the noise floor in the second embodiment, even if the electric wave of various modulation system is received, the interference detection can be accurately conducted, and the reliability of the interference detection is improved. Also, since the interference detection can be implemented by only the radar signal processing without adding the special hardware (H/W) for the interference detection, it is possible to realize the radar system mounted on the vehicle which has high performance and is inexpensive.

Also, for example, in the case of an FM-pulse radar, signals are detected in a frequency rising section and a frequency falling section, respectively, and the distance is calculated by solving the combination of those signals. If the calculated distance is within the detection distance range, it is judged that the substance is a target. In this way, because data of a virtual spectrum is removed by the distance and velocity calculating means, the recognizing means or the like subsequent to the detection logic, the normal threshold level for signal detection goes down to the lowest level in terms of recognizing performance, and a detection sensitivity is improved while a detection error probability of the noise is slightly sacrificed. Accordingly, there is a case in which the white noise is recognized in error as the interference wave in the normal threshold level for the signal detection. In this case, if the threshold level for detection of the interference wave in the second embodiment is set to be higher than the normal threshold level for the signal detection, the probability that the white noise is judged as the interference in error is lowered, thereby being capable of reliably conducting the interference detection.

Third Embodiment

Figure 8:
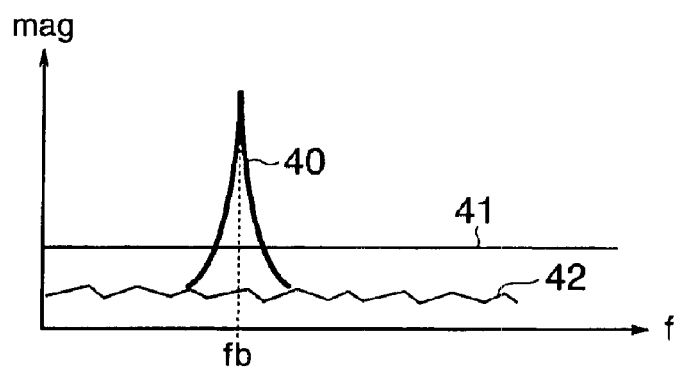
FIG. 8 is an explanatory diagram showing an FFT result when receiving an interference wave in a third embodiment of the present invention.

Another method of judging whether or not the interference wave is observed in Step S500 in the first embodiment will be hereinbelow described as a third embodiment. There is a case in which the transmitting frequency, the modulation timing, the receive timing or the like completely coincide with each other in the interference from the radar of the same modulation system. In this case, since the correlation coincides with each other, there is a case in which the interference wave is reproduced as the normal signal spectrum by FFT. In this case, in the case where a threshold level for detection of the interference wave which is given times of the noise floor level at the time of receiving no interference wave is predetermined as shown in FIG. 8, and a peak level of the reproduced spectrum becomes higher than the threshold level, it is judged that the interference wave is received. In FIG. 8, reference numeral 40 denotes a spectrum noise floor at the time of receiving the interference wave of the radar of the same type, reference numeral 41 is a given threshold level for the interference detection, and reference numeral 42 is a heat noise.

In the third embodiment, since the interference detection is conducted by suspending the transmit operation and detecting the peak of the spectrum, the interference detection can be correctly conducted even if the electric wave of the same modulation system is received, and the reliability of the interference detection is improved. Also, there is a case as well in which an electric wave such as a high-output FM transceiver other than the radar is directly amplified by an amplifier within the radar regardless of the transmitting frequency. The interference detection can be conducted in this case, likewise. Also, since the interference detection can be implemented only by the radar signal processing without adding the special hardware (H/W) for the interference detection, an inexpensive radar system mounted on a vehicle can be realized with high performance. Further, if the threshold level for detection of the interference wave is set to be higher than the normal threshold level for the signal detection, the probability that the white noise is judged as the interference in error is lowered, thereby being capable of reliably conducting the interference detection as in the above-mentioned second embodiment.

Fourth Embodiment

The method of judging whether or not the interference wave is observed in Step S500 in the first embodiment is simultaneously implemented by combining the above-mentioned second embodiment with the above-mentioned third embodiment in this embodiment.

In the fourth embodiment, since the second embodiment and the third embodiment are implemented in combination at the same time, even if various modulation waves are received, the interference detection can be reliably and accurately conducted, and the reliability of the interference detection is further improved. Also, since the interference detection can be implemented only by the radar signal processing without adding the special hardware (H/W) for the interference detection, an inexpensive radar system mounted on the vehicle can be realized with high performance.

Fifth Embodiment

Figure 9:
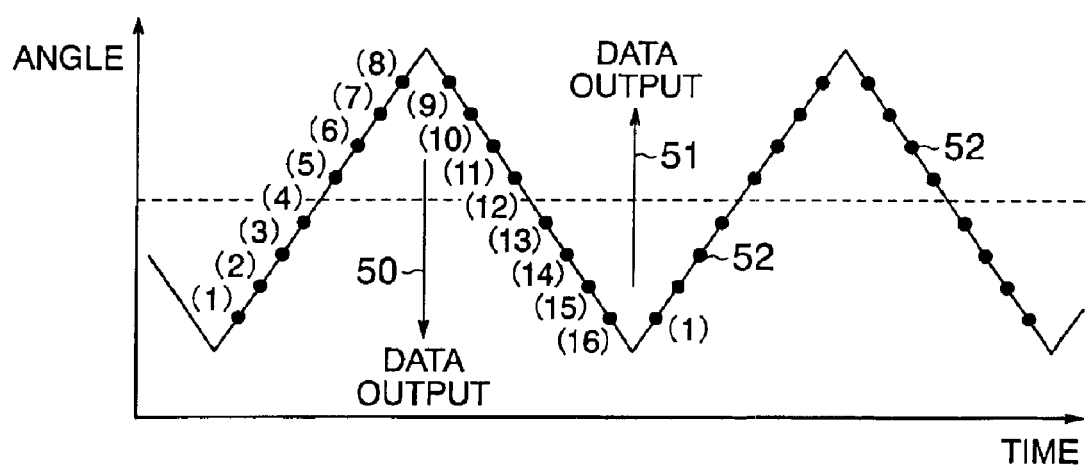
FIG. 9 is an explanatory diagram showing a timing at which a distance and a velocity are measured and its direction in the case of scanning a reflector antenna by an antenna scan motor in accordance with a fifth embodiment of the present invention.

Hereinafter, a fifth embodiment of the present invention will be described with reference to FIG. 9. The structure of the radar is identical with that of the first embodiment shown in FIG. 1. FIG. 9 is a diagram showing a timing at which the distance measuring and the velocity measuring are conducted and their directions in the case where a reflector antenna 52 is scanned by an antenna scan motor 13. In the case where scanning is mechanically conducted as shown in FIG. 9, the same direction is observed in a short period of time at ends of scanning. For example, there exist a direction (8) and a direction (9). In FIG. 9, reference numeral 50 and 51 denote data outputs, and reference numeral 52 is a measurement point. In this case, since substantially the same observation result must be obtained in the direction (8) and the direction (9), a given direction in Step S200 in the first embodiment is set as the direction (9), the transmit operation is suspended and the interference detection is conducted, and measurement data in the direction (9) which must be obtained if the interference detection is not conducted uses the data in the direction (8).

In the fifth embodiment, since the interference detection is conducted in the direction of the scanning end in a given scanning range, there is no influence on the radar performance such as the data output cycle or the angle measurement precision of the radar. Also, a signal processing load does not change. Likewise, if the given direction in Step S200 in the first embodiment is set as the direction (9) and the direction (1), that is, if the interference detection is conducted at both ends of a given scanning range, a frequency at which the interference detection is conducted increases, thereby being capable of more accurately detecting the interference.

Sixth Embodiment

Figure 10:
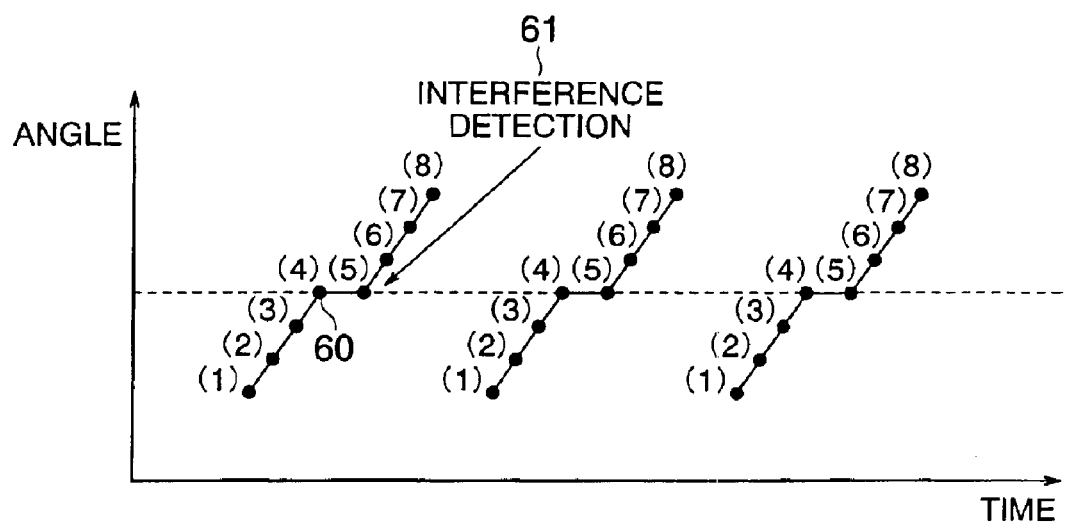
FIG. 10 is an explanatory diagram showing that an interference detection is conducted in the same direction (5) after a normal distance measuring process has been conducted in a center direction (4) in the case of scanning in seven directions in a sixth embodiment of the present invention.

Hereinafter, a sixth embodiment of the present invention will be described with reference to FIG. 10. The structure of the radar is identical with that of the first embodiment shown in FIG. 1. In particular, in the case of adopting an electronic scanning system using an electronic switch or the like, a scanning direction can be freely set. Therefore, in this embodiment, as shown in FIG. 10, for example, in the case of scanning in seven directions, the interference detection is conducted in the same direction (5) after the normal distance measuring process is conducted in a direction (4) which is a center direction in the given scanning range. Note that, in FIG. 10, reference numeral 60 denotes a measurement point (4), and reference numeral 61 is interference detection.

In the sixth embodiment, since the interference detection is conducted in the center direction that is high in use frequency in the distance measuring and important as the radar system mounted on the vehicle, the interference detection can be reliably conducted in the direction that is high in the probability that interference impedes the distance measuring.

Seventh Embodiment

Hereinafter, a seventh embodiment of the present invention will be described. The structure of the radar is identical with that in the first embodiment shown in FIG. 1. In particular, in the case of adopting the electronic scanning system using an electronic switch or the like, a scanning direction can be freely set. Accordingly, in this embodiment, the interference detection is conducted in a forwarding direction of a vehicle of his/her own which is obtained by the handle angle sensor 14. The handle angle sensor 14 may be replaced by a yaw rate sensor or a white line detection camera.

As described above, in the seventh embodiment, since the interference detection is conducted in the vehicle forwarding direction that is highest in the use frequency and important in the distance measuring, the interference detection can be reliably conducted in the direction that is higher in the probability that the distance measuring is impeded.

Eighth Embodiment

Figure 11:
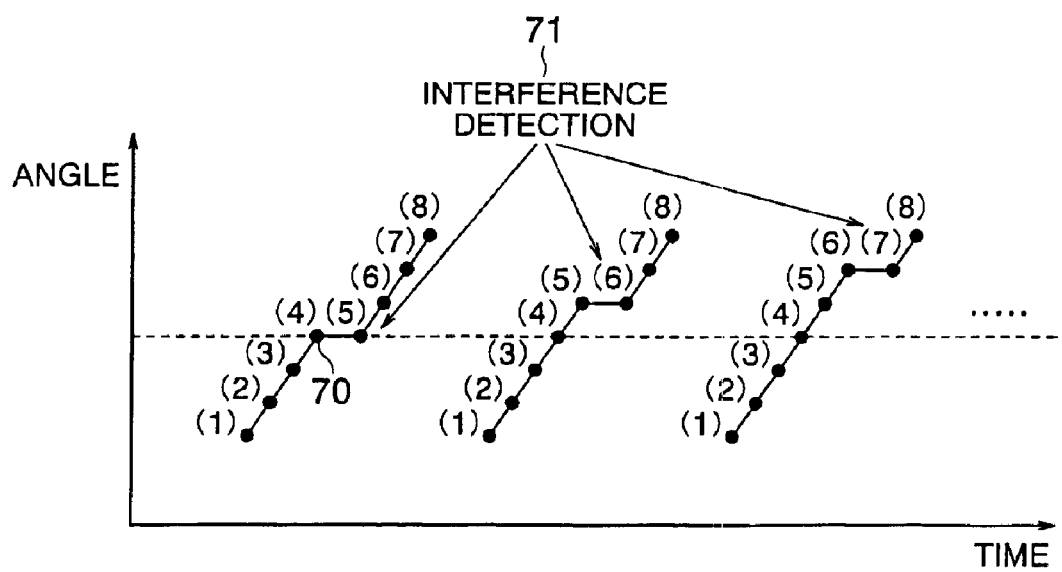
FIG. 11 is an explanatory diagram showing that an interference detection is conducted in all of seven directions or in a part of those directions by sequentially changing the direction along which the interference is detected in the case of scanning in seven directions in an eight embodiment of the present invention.

Hereinafter, an eighth embodiment of the present invention will be described with reference to FIG. 11. The structure of the radar is identical with that of the first embodiment shown in FIG. 1. In particular, in the case of adopting an electronic scanning system using an electronic switch or the like, a scanning direction can be freely set. Therefore, in this embodiment, as shown in FIG. 11, for example, in the case of scanning in seven directions, the interference detection is conducted in all of the seven directions or in a part of those directions by sequentially changing the direction of interference detection. Note that, in FIG. 11, reference numeral 70 denotes a measurement point, and reference numeral 71 is interference detection.

As described above, in the eighth embodiment, since the interference detection is conducted in the entire given scanning range, even the interference wave from only a partial direction can be detected, to thereby improve the reliability of the interference detection.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A radar system mounted on a vehicle for detecting a target object, comprising:

a transmitting means for transmitting an electromagnetic wave;

a receiving means for receiving the electromagnetic wave reflected by the target object;

a signal processing means for measuring a distance between a vehicle and the target object and a relative velocity on the basis of the transmitting electromagnetic wave and the receiving electromagnetic wave; and an interference detecting means for suspending a transmit operation of the transmitting means under a control of the signal processing means, and detecting an interference signal from an external device.

2. A radar system mounted on a vehicle according to claim 1, further comprising a beam scanning means that changes a transmit direction of the electromagnetic wave by the transmitting means and a receive direction of the electromagnetic wave by the receiving means, wherein the interference detecting means suspends the transmit operation in a given scanning direction set by the beam scanning means.

3. A radar system mounted on a vehicle according to claim 2, wherein the given scanning direction set by the beam scanning means is at an end of a predetermined scanning range.

4. A radar system mounted on a vehicle according to claim 2, wherein the given scanning direction set by the beam scanning means is at both ends of a predetermined scanning range.

5. A radar system mounted on a vehicle according to claim 2, wherein the given scanning direction set by the beam scanning means is at a center of a predetermined scanning range.

6. A radar system mounted on a vehicle according to claim 2, wherein the given scanning direction set by the beam scanning means is a forward direction of the vehicle.

7. A radar system mounted on a vehicle according to claim 2, wherein the given scanning direction set by the beam scanning means is sequentially changed within a predetermined scanning range.

8. A radar system mounted on a vehicle according to claim 1, wherein the interference detecting means detects the interference signal by detecting a rise of noise floor.

9. A radar system mounted on a vehicle according to claim 8, wherein the interference detecting means sets a given interference wave detection threshold value that is higher than a normal signal detection threshold value with respect to the rise of the noise floor.

10. A radar system mounted on a vehicle according to claim 1, wherein the interference detecting means detects the interference signal by detecting a peak of a spectrum.

11. A radar system mounted on a vehicle according to claim 10, wherein the interference detecting means sets a given interference wave detection threshold value that is higher than a normal signal detection threshold value with respect to the peak of the spectrum.

12. A radar system mounted on a vehicle according to claim 1, wherein the interference detecting means detects the interference signal by detecting a rise of a noise floor and a peak of a spectrum.

* * * * *